(12) United States Patent
Dedeloudis et al.

(10) Patent No.: US 11,692,325 B2
(45) Date of Patent: Jul. 4, 2023

(54) COMPOSITIONS FOR USE IN GEOSYNTHETIC LINERS

(71) Applicant: IMERTECH SAS, Paris (FR)

(72) Inventors: Christos Dedeloudis, Kifisia (GR); Monika Zervaki, Kifisia (GR); Anton Belev, Kifisia (GR); Christina Kapralou, Kifisia (GR)

(73) Assignee: IMERTECH SAS, Paris (FR)

( * ) Notice: Subject to any disclaimer, the term of this patent is extended or adjusted under 35 U.S.C. 154(b) by 997 days.

(21) Appl. No.: 16/470,017

(22) PCT Filed: Dec. 18, 2017

(86) PCT No.: PCT/EP2017/083385
§ 371 (c)(1),
(2) Date: Jun. 14, 2019

(87) PCT Pub. No.: WO2018/109234
PCT Pub. Date: Jun. 21, 2018

(65) Prior Publication Data
US 2020/0039881 A1 Feb. 6, 2020

(30) Foreign Application Priority Data
Dec. 16, 2016 (GR) .............................. 20160100628

(51) Int. Cl.
*E02D 31/00* (2006.01)
*C04B 33/13* (2006.01)
(Continued)

(52) U.S. Cl.
CPC .......... *E02D 31/004* (2013.01); *C04B 24/383* (2013.01); *C04B 28/001* (2013.01);
(Continued)

(58) Field of Classification Search
CPC ....... E02D 31/004; C04B 33/00; C04B 33/04; C04B 33/1305; C04B 14/10;
(Continued)

(56) References Cited

U.S. PATENT DOCUMENTS 9,328,216 B2 * 5/2016 Di Emidio ............ C04B 28/001
9,403,974 B2 * 8/2016 Webb .................... C04B 28/001
(Continued)

FOREIGN PATENT DOCUMENTS

CN 101679052 A 3/2010
CN 105658322 A 6/2016
(Continued)

OTHER PUBLICATIONS

Search Report for Chinese Application No. 201780086168.0, dated Apr. 7, 2021, 6 pages.
(Continued)

*Primary Examiner* — Frederick L Lagman
(74) *Attorney, Agent, or Firm* — Finnegan, Henderson, Farabow, Garrett & Dunner, LLP (57) ABSTRACT

Described herein is a composition for use in a geosynthetic clay liner, the composition comprising particles, at least some of which are discrete particles and each comprise: a compacted swelling clay, the clay having been compacted such that it at least partially surrounds a fluid-loss preventing polymer. Also described herein is a clay liner formed from the composition, a method for producing particles for use in a geosynthetic clay liner, and a method of forming a clay liner.

18 Claims, 2 Drawing Sheets

(51) Int. Cl.
    *C04B 24/38*    (2006.01)
    *C04B 28/00*    (2006.01)
    *C04B 103/46*   (2006.01)
    *C04B 111/00*   (2006.01)

(52) U.S. Cl.
    CPC ...... *C04B 33/1305* (2013.01); *C04B 2103/46* (2013.01); *C04B 2111/00612* (2013.01); *C04B 2111/00775* (2013.01); *E02D 2300/0043* (2013.01)

(58) Field of Classification Search
    CPC ....... C04B 14/104; C04B 14/12; C08K 3/346; C08K 9/10; C08K 2201/005; C08K 2201/013
    See application file for complete search history.

(56) References Cited

U.S. PATENT DOCUMENTS

| | | | |
|---|---|---|---|
| 9,623,455 B2* | 4/2017 | Di Emidio | ............... B01J 20/12 |
| 10,934,211 B2* | 3/2021 | May | ........................ C04B 24/38 |
| 2010/0087580 A1 | 4/2010 | Libor et al. | |
| 2013/0145959 A1* | 6/2013 | Di Emidio | ............ E02D 31/004 |
| | | | 106/170.57 |
| 2015/0018594 A1* | 1/2015 | Webb | .................... C04B 28/001 |
| | | | 405/129.75 |
| 2015/0251230 A1* | 9/2015 | Di Emidio | ............... B01J 20/24 |
| | | | 405/129.27 |

FOREIGN PATENT DOCUMENTS

| | | | | |
|---|---|---|---|---|
| ES | 2538841 T3 | * | 6/2015 | ........... C04B 14/361 |
| JP | 2003-531715 A | | 10/2003 | |
| KR | 20150108345 A | * | 9/2015 | |
| KR | 20150111341 A | * | 10/2015 | |
| WO | WO 01/66275 A2 | | 9/2001 | |
| WO | WO 2009/038476 A1 | | 3/2009 | |
| WO | WO 2012/101411 A1 | | 8/2012 | |

OTHER PUBLICATIONS

International Search Report and Written Opinion dated Apr. 19, 2018, in International Application No. PCT/EP2017/083385 (12 pgs.).

* cited by examiner

COMPOSITIONS FOR USE IN GEOSYNTHETIC LINERS

CLAIM FOR PRIORITY

This application is a U.S. national phase entry under 35 U.S.C. § 371 from PCT International Application No. PCT/EP2017/083385, filed Dec. 18, 2017, which claims the benefit of priority of GR Application No. 20160100628, filed Dec. 16, 2016, from which this application claims priority and all of which are incorporated herein by reference.

TECHNICAL FIELD

The present application is directed to compositions for use in geosynthetic liners, methods of making the compositions, clay liners containing the compositions and methods of making the clay liners. Clay liners are used in landfill and other industrial sites as barriers to prevent or minimise leakage of contaminated liquid waste into the surrounding soil and ground water.

BACKGROUND

Geosynthetic clay liners (GCLs) are used in many situations, generally to provide a barrier between two areas, to prevent the passage of undesired species (e.g. harmful chemicals and/or electrolytes) from one area to the other. Landfill, industrial waste, industrial mineral and mining sites and fly-ash repositories are examples of areas that the GCLs are used to prevent environmental contamination of the surrounding ground. They generally line the area that contains the waste or other contaminants. Some geosynthetic liners contain a polymer to improve their barrier properties. The polymers can be combined with the clay in a variety of ways. Some techniques involve just simple dry mixing of the clay with the polymers. Other methods involve in-situ polymerisation of the polymer with the clay or the deposition of the polymer from a liquid onto the clay. It has been found that liners containing a dry mixture of clay and polymers can lead to failure of the geosynthetic liners in certain circumstances. It would be desirable to provide an alternative to the geosynthetic clay liners of the prior art, and, ideally, an improvement upon them.

SUMMARY OF THE INVENTION

In a first aspect, there is provided a method for producing particles for use in a geosynthetic clay liner, the method comprising:
  dry mixing first particles comprising a swelling clay and second particles comprising a fluid-loss preventing polymer,
  compacting the dry mixed first and second particles to form one or more compacted bodies,
  crushing the one or more compacted bodies to form discrete particles for use in a geosynthetic liner, at least some of the discrete particles comprising the swelling clay and the fluid-loss preventing polymer, wherein at least some of the fluid-loss preventing polymer is at least partially surrounded by the swelling clay.

In a second aspect, there is provided a composition for use in a geosynthetic clay liner, the composition comprising particles, at least some of which are discrete and each comprise:
  a compacted swelling clay, the clay having been compacted such that it at least partially surrounds a fluid-loss preventing polymer.

In a third aspect, there is provided a clay liner formed from a composition comprising particles, at least some of which are discrete and each comprise:
  a compacted swelling clay, the clay having been compacted such that it at least partially surrounds a fluid-loss preventing polymer,
  wherein the composition has been formed into a layer.

In a fourth aspect, there is provided a method of forming a clay liner, the method comprising:
  providing a composition comprising particles, at least some of which are discrete and each comprise:
  a compacted swelling clay, the clay having been compacted such that it at least partially surrounds a fluid-loss preventing polymer, and
  forming the composition into a layer.

The present inventors have found that some geosynthetic liners fail on absorbing liquid over a period. This has found to be a particular problem with geosynthetic liners containing clay particles that are dry mixed with a polymer. The failure would not be throughout the liner, but would typically be in isolated locations. The cause was identified to be an inhomogeneous distribution of polymer in amongst the different sizes of clay particles. The polymer seemed to preferentially adhere to the smallest particles (typically particles with a size of less than 0.5 mm). Additionally, the smallest sized particles were present in higher density in some parts of the liner than others, and likewise, this corresponded with a higher density of polymer in the liner. This led to inhomogeneous distribution of the polymer throughout the liner, and therefore some areas had lower amounts of polymer than others, and a higher propensity to fail. This was further evidenced by separating a sample containing dry mixed clay particles and polymer into samples having different size distributions and then testing the samples in fluid loss tests. It was found that the particles of lowest size distribution (below 0.5 mm) were found to perform well, but any larger size distributions (e.g. above 0.5 mm and less than 2 mm, and above 2 mm) did not perform well. The present inventors found that by forming discrete particles of bentonite containing polymer in the interior seemed to address the problem, and avoid or reduce the inhomogeneous distribution of the polymer in the liner. They found that such particles could still be produced in a method involving the dry mixing of the clay particles and the polymer. The resultant particles, of all size distributions, were found to perform well in fluid loss tests.

DETAILED DESCRIPTION

The aspects and optional and preferred features of the aspects are described below. Any optional or preferred feature may be combined with any aspect and/or any other optional or preferred feature as described herein.

In a first aspect, there is provided a method for producing particles for use in a geosynthetic clay liner, the method comprising:
- dry mixing first particles comprising a swelling clay and second particles comprising a fluid-loss preventing polymer (to form dry mixed first and second particles),
- compacting the dry mixed first and second particles to form one or more compacted bodies,
- crushing the one or more compacted bodies to form discrete particles for use in a geosynthetic liner, at least some of the discrete particles comprising the swelling clay and the fluid-loss preventing polymer, wherein at least some of the fluid-loss preventing polymer is at least partially surrounded by the swelling clay.

First Particles

The first particles may comprise, consist essentially of or consist of a swelling clay (including any moisture that is present in the clay). "Consist essentially of" may indicate that the particles include at least 90 wt % clay, optionally at least 95 wt % clay, optionally at least 98 wt % clay, optionally at least 99 wt % clay, optionally at least 99.5 wt % clay (including any moisture that is present in the clay).

Preferably, at least 90 wt % of the first particles pass through a sieve having openings of 1.5 mm or less. Preferably, at least 90 wt % of the first particles pass through a sieve having openings of 1.0 mm or less. Preferably, at least 90 wt % of the first particles pass through a sieve having openings of 0.8 mm or less.

The sieve analysis of any particles as defined herein may be carried out using any suitable method, which may be a standardised method, e.g. ASTM C136-14. The sieve may be as defined in a standardised test, for example as laid out in ASTM E11-16.

Preferably, the first particles have a moisture content of at least 1 wt % to 15 wt %, optionally from 3 wt % to 12%, optionally from 4 wt % to 12 wt %, optionally from 5 wt %, to 12 wt %, optionally from 6 wt % to 11 wt %, optionally from 7 wt % to 10 wt %. It was found that too low a moisture level led to problems in the compacting step. Accordingly, a higher amount of moisture seemed to promote adherence of the particles and the polymer during the compacting step.

Swelling Clay

The swelling clay may be defined as a clay, which, on contact with water, swells. The swelling clay may comprise a material selected from a smectite clay and a vermiculite clay. Optionally, the smectite clay comprises a material selected from montmorillonite, beidellite, nontronite, hectorite, saponite, sauconite and laponite. Preferably, the smectite clay comprises a bentonite. Bentonite is an aluminium phyllosilicate clay, comprising a large proportion (e.g. at least 70 wt %, optionally at least 75 wt %, optionally at least 80 wt %) of montmorillonite. The bentonite may be selected from an alkali metal bentonite and an alkali earth metal bentonite. The bentonite may be selected from sodium bentonite, calcium bentonite and potassium bentonite or sodium-treated calcium or potassium bentonite also referred as activated sodium bentonite.

Fluid-Loss Preventing Polymer

The fluid-loss preventing polymer may be defined as a polymer, which, when combined with a swelling clay, can prevent fluid loss, for example in a fluid loss test, such as that defined in ASTM-D5891.

The fluid-loss preventing polymer may be selected from an anionic polymer, a non-ionic polymer and a cationic polymer.

Optionally, the fluid-loss preventing polymer comprises an anionic polymer. The anionic polymer may be a polymer having a polymer chain having pendant groups selected from carboxylate groups, sulfonate groups and phosphonate groups. The fluid-loss preventing polymer, which may be an anionic polymer, may be selected from a polyanionic cellulose, polyacrylamides, e.g. hydrolysed acrylamides, a polystyrene functionalized with an acid selected from sulfonic acid, phosphonic acid and carboxylic acid, poly(sodium styrene sulfonate), an allyl sulfonic acid or salt thereof, polyacrylates, polyacrylic acid, a polyvinyl pyrrolidone, polyvinyl alcohol and polyvinyl acetate.

The polyanionic cellulose may comprise carboxymethyl cellulose, which may be an alkali metal carboxymethyl cellulose, such as sodium carboxymethyl cellulose. The carboxymethyl cellulose may have been formed from the reaction of alkali cellulose and sodium chloroacetate or monochloroacetic acid. The alkali cellulose may have been formed by swelling cellulose-containing fibres (such as wood or cotton) using sodium hydroxide. The molecular weight of the carboxymethyl cellulose may be from 21,000 Daltons to 1,000,000 Daltons, optionally from 21,000 Daltons to 800,000 Daltons, optionally from 21,000 Daltons to 500,000 Daltons. The polyanionic cellulose may be selected from technical grade carboxymethyl cellulose, i.e. a cellulose that is of purity of from 60 to 80 wt %. The polyanionic cellulose may be a purified polyanionic cellulose, e.g. a cellulose that is of purity of at least 80 wt %, preferably at least 85 wt %, preferably at least 90 wt %. The impurities in polyanionic cellulose (i.e. the species present apart from carboxymethyl cellulose) are typically the byproducts of the formation reaction, e.g. sodium glycolate and sodium chloride. The polyanionic cellulose may have a degree of substitution of from 0.5 to 1.5 (i.e. 5 to 15 carboxymethyl groups per 10 anhydroglucose units), optionally from 0.6 to 1.5, optionally from 0.6 to 1.2, optionally from 0.6 to 1.0, optionally from 1.0 to 1.5, optionally from 1.1 to 1.5. The method of measuring the degree of substitution is described in many sources in the literature, e.g. for example in an article authored by Ambjornsson et al (2013) "CMC mercerization" BioResources 8(2) 1918-1932 (and available from https://www.ncsu.edu/bioresources/BioRes_08/BioRes_08_2_1918_Ambjornsson_SG_CMC_Merceriz_NIR_Raman_3599.pdf), which is incorporated herein by reference.

The polyacrylamide may be selected from poly(methylacrylamide), poly(N,N-dimethylacrylamide), poly(N-isopropylacrylamide), poly(N-acetamidoacrylamide), and poly (N-acetamidomethacrylamide), poly(2-acrylamido-2-methyl-propanesulfonic acid) and poly(3-acrylamido-3-methylbutanoate), and salts thereof. The polyacrylamide may be hydrolysed, i.e. at some of the acrylamide groups have been hydrolysed. The degree of hydrolysis of the polyacrylamide may be from 0.5% to 10%, where the degree of hydrolysis may be defined as the percentage of amide groups that are in hydrolysed form.

The polymer may comprise be formed from a monomer selected from acrylic acid, methacrylic acid, 2-ethylacrylic acid, 2-propylacrylic acid, 2-bromoacrylic acid, 2-(trifluoromethyl) acrylic acid and salts of acrylic acid (e.g., sodium acrylate), salts of methacrylic acid, 2-propylacrylic acid (e.g., sodium methacrylate), salts of 2-ethylacrylic acid, salts of 2-propylacrylic acid, salts of 2-bromoacrylic acid, salts of 2-(bromomethyl) acrylic acid and salts of 2-(trifluoromethyl) acrylic acid. The salts may be selected from a salt selected from an alkali metal salt, such as sodium or potassium salt, and an alkali earth metal salt, such as magnesium or calcium salt.

The salt of allyl sulfonic acid may be a salt of 3-allyloxy-2-hydroxy-1-propanesulfonic acid.

The polystyrene functionalized with sulfonic acid, phosphonic acid, or carboxylic acid may be formed from styrene monomers functionalized with sulfonic acid, phosphonic acid and carboxylic acid. The polystyrene functionalized with sulfonic acid, phosphonic acid, or carboxylic acid may be formed from styrene monomers selected from 2-vinylbenzoic acid, 3-vinylbenzoic acid, 4-vinylbenzoic acid, 2-vinylbenzenesulfonic acid, 3-vinylbenzenesulfonic acid, 4-vinylbenzenesulfonic acid, 2-vinylbenzenephosphonic acid, 3-vinylbenzenephosphonic acid and 4-vinylbenzenephosphonic acid.

The fluid-loss preventing polymer may comprise a gum. The gum may be selected from acacia gum, alginic acid, agar, a salt of an alginate (e.g. a salt selected from an alkali metal salt, such as sodium or potassium alginate, and an alkali earth metal salt, such as calcium or magnesium alginate), carrageenan, a guar gum, a guiac gum, a karaya gum, locust bean gum, tragacanth gum and pectin.

The fluid-loss preventing polymer may comprise a polyvinyl pyrrolidone, which may be selected from an anionic polyvinyl pyrrolidone, a cationic polyvinyl pyrrolidone and a non-ionic polyvinyl pyrrolidone. The polyvinyl pyrrolidone may contain repeating units of formula (I)

formula (I)

At least some of the repeating units of the polyvinyl pyrrolidone may be hydrolysed and of formula (II):

formula (II)

where M is selected from H and a metal, such as an alkali metal, and an alkali earth metal. The alkali metal may be selected from lithium, sodium and potassium. The alkali earth metal may be selected from magnesium and potassium (and be present in quantities relative to the monomer above to ensure charge neutrality of the polymer as a whole).

The fluid-loss preventing polymer may comprise a cationic polymer. The cationic polymer may be a polyquarternium polymer. Polyquarternium is the International Nomenclature for Cosmetic Ingredients designation for certain polycationic polymers. The fluid-loss preventing polymer may be selected from Polyquarternium-1, Polyquarternium-2, Polyquarternium-3, Polyquarternium-4, Polyquarternium-5, Polyquarternium-6, Polyquarternium-7, Polyquarternium-8, Polyquarternium-9, Polyquarternium-10, Polyquarternium-11, Polyquarternium-12, Polyquarternium-13, Polyquarternium-14, Polyquarternium-15, Polyquarternium-16, Polyquarternium-17, Polyquarternium-18, Polyquarternium-19, Polyquarternium-20, Polyquarternium-21, Polyquarternium-22, Polyquarternium-23, Polyquarternium-24, Polyquarternium-25, Polyquarternium-26, Polyquarternium-27, Polyquarternium-28, Polyquarternium-29, Polyquarternium-30, Polyquarternium-31, Polyquarternium-32, Polyquarternium-33, Polyquarternium-34, Polyquarternium-35, Polyquarternium-36, Polyquarternium-37, Polyquarternium-38, Polyquarternium-39, Polyquarternium-40, Polyquarternium-41, Polyquarternium-42, Polyquarternium-43, Polyquarternium-44, Polyquarternium-45, Polyquarternium-46, Polyquarternium-47.

In some examples, the cationic polymer may contain pendent side chains comprising a group selected from a protonated amine group (which may be a primary, secondary or tertiary amine group) and a quaternary ammonium group. The cationic polymer may comprise a cationic acrylamide polymer or a cationic acrylate polymer. The cationic polymer may comprise a polymer formed from a monomer selected from a dialkylaminoalkyl(meth)acrylate and dialkylaminoalkyl(meth)acryl-amides with C1 to C3-alkyl or Ci to C3-alkylene groups, and optionally at least some of the amino groups in the polymer are protonated or quarternized. The cationic polymer may comprise a polymer formed from a monomer selected from the methyl halogen-quaternized, ethyl halogen-quaternized, propyl halogen-quaternized, or isopropyl-quaternized ammonium salts of N,N-dimethylaminomethyl(meth)acrylate, N,N-dimethylaminoethyl(meth)acrylate, N,N-dimethylaminopropyl(meth)acrylate, N,N-diethyl-aminomethyl(meth)acrylate, N,N-diethylaminoethyl(meth)acrylate, N,N-diethylaminopropyl-(meth)acrylate, N,N-dimethylaminomethyl(meth)acrylamide, N,N-dimethylaminoethyl-(meth)acrylamide and N,N-dimethylaminopropyl(meth)acrylamide.

Non-anionic polymers may include polymers containing a polymer selected from poly(ethylene oxide), e.g. having poly(ethylene oxide) having at least 50 monomer units, optionally at least 100 monomer units, optionally at least 500 monomer units; poly(vinyl methyl ether), e.g. poly(vinyl methyl ether) having at least 50 monomer units, optionally at least 100 monomer units, optionally at least 500 monomer units; poly(vinyl alcohol), poly(vinyl acetate), co-polymers of poly(vinyl alcohol) and poly(vinyl acetate), polyvinyloxazolidone and polyvinylmethyloxazolidone.

The fluid-loss preventing polymer may comprise a polymer have a molecular weight of at least 300,000 Daltons, optionally at least 500,000 Daltons, optionally at least 800,000 Daltons, optionally at least 1,000,000 Daltons, optionally at least 1,200,000 Daltons, optionally at least 1,500,000 Daltons, optionally at least 2,000,000 Daltons, optionally at least 2,500,000 Daltons, optionally at least 3,500,000 Daltons.

The fluid-loss preventing polymer may comprise a polymer have a molecular weight of from 300,000 Daltons to 2,000,000 Daltons, optionally from 300,000 Daltons to 1,500,000 Daltons, optionally from 300,000 Daltons to 1,000,000. The fluid-loss preventing polymer may comprise a polymer have a molecular weight of from 1,000,000 Daltons to 4,000,000 Daltons, optionally from 1,000,000 Daltons to 3,000,000 Daltons. Molecular weight may be measured using a suitable technique, including, but not limited to gel permeation chromatography, and, in an embodiment, the molecular weight of the polymer is a weight average molecular weight or a number average molecular weight.

The fluid-loss preventing polymer may constitute from 0.5 wt % to 10 wt % of the mixture of first and second particles, optionally from 0.5 wt % to 5 wt % of the mixture of first and second particles, optionally from 0.5 wt % to 4 wt % of the mixture of first and second particles, optionally from 1 wt % to 4 wt % of the mixture of first and second particles, optionally from 1.5 wt % to 4 wt % of the mixture of first and second particles, optionally from 2 wt % to 4 wt % of the mixture of first and second particles, optionally from 2 wt % to 3 wt % of the mixture of first and second particles.

The swelling clay may be combined with any of the fluid-loss preventing polymers described herein. In an embodiment, the swelling clay is or comprises a material selected from a smectite clay and a vermiculite clay and optionally, the smectite clay comprises a material selected from montmorillonite, beidellite, nontronite, hectorite, saponite, sauconite and laponite, or optionally, the smectite clay comprises a bentonite, and the fluid-loss prevent polymer is an anionic polymer, optionally a polyanionic cellulose, which may be as described herein. In an embodiment the swelling clay is or comprises bentonite and the fluid-loss prevent polymer is or comprises an anionic polymer, optionally a polyanionic cellulose.

Dry Mixing

The dry mixing of the first particles comprising the swelling clay and the second particles comprising the fluid-loss preventing polymer may indicate that, during the mixing, the particles are in dry, flowable form, i.e. in the form of a powder, and not suspended in a liquid. The particles may nevertheless contain moisture, i.e. water, in their interior.

The dry mixing may be achieved using any suitable means. Preferably, the first particles and second particles are combined in a chamber, with suitable agitation, such as agitation selected from shaking and stirring. Dry mixing may be achieved using a mixer selected from a drum blender, a V-blender, a bin blender, and a double-cone blender. The mixer may be a convective blender, which may be defined as a stationary vessel swept by a rotating impeller. The convective blender may be selected from the group consisting of a ribbon blender (a cylindrical vessel with a helical ribbon impeller mounted on a shaft, which may be a horizontal shaft), a paddle blender (a modified ribbon blender with paddles instead of a helical ribbon), a Nauta blender (a vertically oriented conical tank swept out by a rotating and precessing screw impeller), a Forberg mixer (two paddle blender drives sweeping two connected troughs), a Z-blade blender (a cylindrical vessel swept out by a Z-shaped blade), and a Lodige mixer (similar to a kitchen mixer where plough-shaped shovels rotate a cylindrical drum).

The dry mixer may have any suitable volume, e.g. a volume of at least 0.5 m$^3$, optionally a volume of at least 1 m$^3$, optionally a volume of at least 2 m$^3$, optionally a volume of at least 3 m$^3$, optionally a volume of at least 4 m$^3$, optionally a volume of from 0.5 m$^3$ to 10 m$^3$, optionally a volume of from 1 m$^3$ to 10 m$^3$, optionally a volume of from 3 m$^3$ to 9 m$^3$, optionally a volume of 4 m$^3$ to 8 m$^3$, optionally a volume of 5 m$^3$ to 7 m$^3$, optionally about 6 m$^3$.

If the dry mixer contains a rotating impeller, the impeller may rotate at a speed of at least 5 rpm, optionally at least 10 rpm, optionally at least 15 rpm. If the dry mixer contains a rotating impeller, the impeller may rotate at a speed of from 5 rpm to 500 rpm, optionally 5 rpm to 200 rpm, optionally 5 rpm to 100 rpm, optionally 5 rpm to 50 rpm, optionally 5 rpm to 35 rpm, optionally 10 rpm to 35 rpm, optionally 15 rpm to 35 rpm, optionally 15 rpm to 30 rpm, optionally 18 rpm to 28 rpm, optionally 20 rpm to 26 rpm, optionally 21 rpm to 25 rpm, optionally about 22 rpm to 24 rpm, optionally about 23 rpm.

The first and second particles may be mixed until a point in time that they are distributed among one another, e.g. distributed reasonably evenly among one another. The first and second particles may be mixed for a period of at least 10 seconds, optionally at least 30 seconds, optionally at least a minute, optionally at least 90 seconds. The first and second particles may be mixed for a period of from 10 seconds to 1 hour, optionally from 10 seconds to 30 minutes, optionally from 10 seconds to 30 minutes, optionally from 10 seconds to 20 minutes, optionally from 10 seconds to 20 minutes, optionally from 10 seconds to 10 minutes, optionally from 30 seconds to 10 minutes, optionally from 1 minute to 10 minutes, optionally from 1 minute to 5 minutes, optionally from 2 minutes to 4 minutes, optionally from 1 minute to 3 minutes, and the dry mixer may contain a rotating impeller, the impeller rotating at a speed of at least 5 rpm, optionally at least 10 rpm, optionally at least 15 rpm. If the dry mixer contains a rotating impeller, the impeller may rotate at a speed of from 5 rpm to 500 rpm, optionally 5 rpm to 200 rpm, optionally 5 rpm to 100 rpm, optionally 5 rpm to 50 rpm, optionally 5 rpm to 35 rpm, optionally 10 rpm to 35 rpm, optionally 15 rpm to 35 rpm, optionally 15 rpm to 30 rpm, optionally 18 rpm to 28 rpm, optionally 20 rpm to 26 rpm, optionally 21 rpm to 25 rpm, optionally about 22 rpm to 24 rpm, optionally about 23 rpm.

Compacting

The method comprises compacting the dry mixed first and second particles to form one or more compacted bodies. The compacting may involve any technique that presses the particles together with sufficient pressure that they adhere to one another to form the compacted bodies. In an embodiment, the compacting involves pressing the dry mixed first and second particles between two members. The members may move relative to one another such that one of the members moves closer to the other to press the dry mixed first and second particles between the members. In an alternative embodiment, at least one of the members may rotate in close proximity to the other member, and, by rotating, feed first and second particles between the members to press the first and second particles together. In an embodiment, two members rotate in opposing directions and, by rotating, feed first and second particles between the members to press the first and second particles together. In an embodiment, one or both of the rotating members may be in the form of a cylinder, which may have indentations in the surface, and the indentations may be in the form of concave surface, and the indentations may, when viewed from a radial direction of the cylinder, may be in a circular, oval or ovoid shape.

If the compacting comprises rotating a member, and feeding the first and second particles past the member, the member may rotate at a speed of at least 5 rpm, optionally at least 10 rpm, optionally at least 15 rpm. If the compacting comprises rotating a member, and feeding the first and second particles past the member, the member may rotate at a speed of 5 rpm to 500 rpm, optionally 5 rpm to 200 rpm, optionally 5 rpm to 100 rpm, optionally 5 rpm to 50 rpm, optionally 5 rpm to 40 rpm, optionally 10 rpm to 40 rpm, optionally 10 rpm to 30 rpm, optionally 12 rpm to 23 rpm, optionally 14 rpm to 21 rpm, optionally 15 rpm to 19 rpm, optionally 16 rpm to 18 rpm, optionally about 17 rpm.

The compacting may involve applying a pressure to the first and second particles of at least 1 MPa ($1\times10^6$ Pa), optionally at least 2 MPa, optionally at least 3 MPa, optionally at least 4 MPa, optionally at least 5 MPa, optionally at least 6 MPa, optionally at least 7 MPa, optionally at least 8 MPa, optionally at least 9 MPa, optionally at least 9.5 MPa. The compacting may involve applying a pressure to the first and second particles of from 1 MPa to 30 MPa, optionally 3 MPa to 20 MPa optionally 3 MPa to 17 MPa, optionally from 5 MPa to 15 MPa, optionally from 6 MPa to 14 MPa, optionally from 7 MPa to 13 MPa, optionally from 8 MPa to 12 MPa, optionally from 9 MPa to 12 MPa.

In an embodiment, compacting the dry mixed first and second particles to form one or more compacted bodies involves passing the first and second particles through a compactor that applies a pressure of at least $3.45 \times 10^6$ Pa or 500 psi to the particles, optionally a pressure of at least $6.89 \times 10^6$ Pa or 1000 psi to the particles, optionally a pressure of from $9.65 \times 10^6$ Pa to $1.17 \times 10^7$ Pa to the particles or a pressure of from 1400 psi to 1700 psi to the particles.

The compactor may process at least 0.5 mt of the first and second particles per hour, optionally at least 1.5 mt of the first and second particles per hour, at least 1.7 Mt of the first and second particles per hour.

Compacted Bodies

The one or more compacted bodies may be in any form, depending on the nature of the compacting. They may, for example, be in sheet or globular form, with globular indicating an object with rounded sides, e.g. in ovoid or spheroid shape. The compacted bodies may have a largest dimension, measured across the body, of at least 0.5 mm, optionally at least 1 mm, optionally at least 5 mm, optionally at least 10 mm, optionally at least 15 mm, optionally at least 20 mm, optionally at least 25 mm.

Crushing

The crushing may be any step to pulverise the one or more compacted bodies to form discrete particles, i.e. pulverising each compacted body into a plurality of discrete particles. The crushing may involve applying pressure to the compacted body and/or grinding the compacted body. The crushing may involve passing the one or more compacted bodies past rotating members, e.g. rollers, to pulverise them and form the discrete particles. The crusher may be a smooth roll crusher. Each roller may have an outer shell of a hard-wearing material, which may have a smooth surface, e.g. a metallic material or a ceramic material. The rotating members may rotate with a speed of from 30 rpm to 200 rpm, optionally from 50 rpm to 180 rpm, optionally a speed of from 70 rpm to 170 rpm, optionally a speed of from 90 rpm to 150 rpm, optionally a speed of from 100 rpm to 140 rpm, optionally a speed of from 110 rpm to 130 rpm. The rollers may be spaced apart from one another (at the nip) by a distance that is smaller than the largest dimension of the compacted bodies. The rollers may be spaced apart from one another (at the nip) by a distance of from 1 mm to 15 mm, optionally 3 mm to 10 mm, preferably when the compacted bodies have a largest dimension, measured across the body, of at least 15 mm, optionally at least 20 mm, optionally at least 25 mm.

Discrete Particles

Optionally, at least some of the discrete particles have a particle size of 0.2 mm to 3 mm, optionally a particle size of from 0.5 mm to 2 mm. Particle size may indicate a largest dimension measured across the discrete particle, and such size may be measured using any suitable technique.

Optionally, at least 90 wt % of the discrete particles pass through a sieve with openings of 3 mm and/or are retained on a sieve with openings of 0.2 mm.

Optionally, at least 90 wt % of the discrete particles pass through a sieve with openings of 2 mm and/or are retained on a sieve with openings of 0.5 mm.

Optionally, the crushing the one or more compacted bodies to form discrete particles results in the discrete particles, at least some of which have a particle size of from 0.2 mm to 3 mm, optionally a particle size of from 0.5 mm to 2 mm.

Optionally, the crushing forms discrete particles, which are then sieved such that at least 90 wt % of the discrete particles pass through a sieve with openings of 3 mm.

Optionally, the crushing forms discrete particles, which are then sieved such that at least 90 wt % of the discrete particles are retained on a sieve with openings of 0.2 mm.

Optionally, the crushing forms discrete particles, which are then sieved such that at least 90 wt % of the discrete particles pass through a sieve with openings of 3 mm and are retained on a sieve with openings of 0.2 mm.

Optionally, the crushing forms discrete particles, which are then sieved such that at least 90 wt % of the discrete particles pass through a sieve with openings of 2 mm.

Optionally, the crushing forms discrete particles, which are then sieved such that at least 90 wt % of the discrete particles are retained on a sieve with openings of 0.5 mm.

Optionally, the crushing forms discrete particles, which are then sieved such that at least 90 wt % of the discrete particles pass through a sieve with openings of 2 mm and are retained on a sieve with openings of 0.5 mm.

Optionally, after the crushing, the discrete particles are separated, e.g. by sieving, into at least two samples having different size distributions: a first sample and a second sample, and, if the second sample contains larger particles than the first sample, particles of the second sample are re-processed to reduce their size and if the second sample contains smaller particles than the first sample, particles of the second sample are re-compacted to form one or more further compacted bodies, which are then re-crushed to form discrete particles with larger particles than the second sample.

Optionally, after the crushing, the discrete particles are separated, e.g. by sieving, into at least three samples having different size distributions: a first sample, a second sample, and a third sample, the second sample containing larger particles than the first sample, particles of the second sample being re-processed to reduce their size, and the third sample containing smaller particles than the first sample, particles of the third sample being re-compacted to form one or more further compacted bodies, which are then re-crushed to form discrete particles with larger particles than the third sample.

If a first sample "contains larger particles" than a second sample (or other sample), this may indicate that the first sample has a D50 that is more than the second sample (or other sample). If a first sample "contains smaller particles" than a second sample (or other sample), this may indicate that the first sample is a sample that passes through a sieve, and the second sample may be the sample that is retained on the same sieve. If a first sample "contains larger particles" than a second sample (or other sample), this may indicate that the first sample is a sample that is retained on a sieve, and the second sample may be the sample that passes through the same sieve. If a first sample "contains smaller particles" than a second sample (or other sample), this may indicate that the first sample has a D50 that is less than the second sample (or other sample). D50 may be measured using any suitable technique, e.g. laser light scattering, for example in accordance with ASTM UOP856-07. The laser light scattering measurements in accordance with this standard may be performed with a Microtrac Model S3500 instrument commercially available from Microtrac Inc., or a Malvern Instruments Mastersizer 3000. As sample that is retained on a sieve will typically have a large D50 than a sample that passes through a sieve.

Optionally, the first sample is as described above, e.g. containing discrete particles such that at least 90 wt % of the discrete particles pass through a sieve with openings of 3 mm and are retained on a sieve with openings of 0.2 mm, or at least 90 wt % of the discrete particles pass through a sieve with openings of 2 mm and are retained on a sieve with openings of 0.5 mm.

At least some of the discrete particles comprise the swelling clay and the fluid-loss preventing polymer, and at least some of the fluid-loss preventing polymer is at least partially, optionally completely, surrounded by the swelling clay. In the particles, the fluid-loss preventing polymer may be in the form of lumps substantially devoid of clay, but be surrounded, at least partially, by clay.

The crushing the one or more compacted bodies forms the discrete particles for use in a geosynthetic liner indicates that the particles are suitable for use in a geosynthetic liner, but the method does not necessarily form a geosynthetic liner. The discrete particles formed in the method may be in loose flowable form. To form them into a geosynthetic liner may further involve forming them into a layer, possibly between two sheets, as described in more detail below.

Composition

In a second aspect, there is provided a composition for use in a geosynthetic clay liner, the composition comprising particles, at least some of which are discrete and each comprise:

a compacted swelling clay, the clay having been compacted such that it at least partially surrounds a fluid-loss preventing polymer.

The composition may comprise discrete particles formed in a method as described herein. The compacted swelling clay, the fluid-loss preventing polymer and the nature of the discrete particles may be as described above. In an embodiment, the swelling clay comprises a material selected from a smectite clay and a vermiculite clay. Optionally, the smectite clay comprises a material selected from montmorillonite, beidellite, nontronite, hectorite, saponite, sauconite and laponite. Optionally, the smectite clay comprises a bentonite. The swelling clay may be combined with any of the fluid-loss preventing polymers described herein. In an embodiment, the swelling clay is comprises a material selected from a smectite clay and a vermiculite clay and optionally, the smectite clay comprises a material selected from montmorillonite, beidellite, nontronite, hectorite, saponite, sauconite and laponite, or optionally, the smectite clay comprises a bentonite, and the fluid-loss prevent polymer is an anionic polymer, optionally a polyanionic cellulose, which may be as described herein. In an embodiment the swelling clay is bentonite and the fluid-loss prevent polymer is an anionic polymer, optionally a polyanionic cellulose.

For example, optionally, at least some of the discrete particles have a particle size of 0.2 mm to 3 mm, optionally a particle size of from 0.5 mm to 2 mm. Particle size may indicate a largest dimension measured across the discrete particle, and such size may be measured using any suitable technique. Optionally, at least 90 wt % of the discrete particles pass through a sieve with openings of 3 mm and/or are retained on a sieve with openings of 0.2 mm. Optionally, at least 90 wt % of the discrete particles pass through a sieve with openings of 2 mm and/or are retained on a sieve with openings of 0.5 mm.

The fluid-loss preventing polymer may constitute from 0.5 wt % to 10 wt % of the mixture of the discrete particles, optionally from 0.5 wt % to 5 wt % of the mixture of the discrete particles, optionally from 0.5 wt % to 4 wt % of the mixture of the discrete particles, optionally from 1 wt % to 4 wt % of the mixture of the discrete particles, optionally from 1.5 wt % to 4 wt % of the mixture of the discrete particles, optionally from 2 wt % to 4 wt % of the mixture of the discrete particles, optionally from 2 wt % to 3 wt % of the mixture of the discrete particles.

Preferably, the composition shows a fluid loss result of less than 15 ml for NaCl @1%, when measured according to ASTM-D5891. The composition may have a size distribution of +1 mm. The composition may have a size distribution of +0.5 mm/−1 mm. The composition may have a size distribution of −1 mm.

Preferably, the composition shows a fluid loss result of less than 30 ml for NaCl @4%, when measured according to ASTM-D5891. The composition may have a size distribution of +1 mm. The composition may have a size distribution of +0.5 mm/−1 mm. The composition may have a size distribution of −1 mm.

As mentioned, the sieve analysis of any particles as defined herein (e.g. in terms of size distribution as described above) may be carried out using any suitable method, which may be a standardised method, e.g. ASTM C136-14. The sieve may be as defined in a standardised test, for example as laid out in ASTM E11-16.

In an embodiment, if the composition is divided up into three samples, the first sample having a size distribution of particles of +1 mm, the second sample having a size distribution of particles of +0.5 mm/−1 mm, and the third sample having a size distribution of −0.5 mm, and each of first, second and third samples would show a fluid loss result of less than 15 ml for NaCl @1%, when measured according to ASTM-D5891. A size distribution of +1 mm indicates a sample in which at least 90 wt % of particles are retained on a sieve having openings of 1 mm. A size distribution of particles of +0.5 mm/−1 mm indicates a sample in which at least 90 wt % of particles are retained on a sieve having openings of 0.5 mm and pass through a sieve having openings of 1 mm. A size distribution of −0.5 mm indicates a sample in which at least 90 wt % of particles pass through a sieve having openings of 0.5 mm. NaCl @1% indicates NaCl is present in 1 wt % in an aqueous liquid.

In an embodiment, if the composition is divided up into three samples, the first sample having a size distribution of particles of +1 mm, the second sample having a size distribution of particles of +0.5 mm/−1 mm, and the third sample having a size distribution of −0.5 mm, and each of first, second and third samples would show a fluid loss result of less than 30 ml for NaCl @4%, when measured according to ASTM-D5891. NaCl @4% indicates NaCl is present in 4 wt % in an aqueous liquid.

Clay Liner

In a third aspect, there is provided a clay liner formed from a composition comprising particles, at least some of which are discrete and each comprise:

a compacted swelling clay, the clay having been compacted such that it at least partially surrounds a fluid-loss preventing polymer, wherein the composition has been formed into a layer.

The clay liner may comprise the composition that has been formed into a layer, as described above, and may or may not comprise one or more other sheets of material. If the clay liner comprises one or more other sheets of material, as well as the composition described herein, the clay liner may be termed a geosynthetic clay liner. The one or more other sheets of material may be in the form of a porous sheet, e.g. textile sheet, or a film. A film may be defined as a sheet lacking pores therethrough. The composition described here may be sandwiched between two sheets of material and may be held in place in the clay liner by mechanical means, e.g. means selected from needle punching, compression, and stitch bonding.

The textile may comprise a polymeric material, e.g. a polymeric material selected from a polypropylene, polyester, and a blend thereof. The textile may be woven or nonwoven. The nonwoven textiles may be needle-punched and heat-bonded types of textiles. In an embodiment, the textile may be selected from a polypropylene ("PP") nonwoven or woven textile, polyethylene terephthalate ("PET") woven or nonwoven textile, or woven or nonwoven textiles that comprise a blend of PP and PET.

Optionally, the textile may be coated with a coating or laminated with a film. The coatings may be selected from PP coatings and polyurethane coatings, and may be present on the composition-facing side of the textile or the other side, or both sides. The film may be laminated to a geotextile through a lamination process. Examples of suitable lamination techniques include heat processes and adhesive bonding. Using coatings or laminations may improve the durability of the geosynthetic clay liner.

The clay liner may further comprise a film. The film may be a water-impermeable film. The film may have a thickness of at least about 50 μm, optionally at least about 100 μm, optionally at least about 150 μm, optionally at least about 200 μm, optionally at least about 250 μm. Films having a thickness of at least 250 μm may be termed a membrane. The film may have a thickness of from about 50 μm to about 250 μm. The film may comprise a polymeric material selected from high density polyethylene ("HDPE"), low density polyethylene ("LDPE"), liner low density polyethylene ("LLDPE"), PP, polyvinylchloride ("PVC"), thermoplastic olefinic elastomers ("TPO"), ethylene propylene diene monomer ("EPDM"), and blends thereof. Optionally the film may be reinforced with a textile, e.g. as described above.

Method of Forming a Clay Liner

In a fourth aspect, there is provided a method of forming a clay liner, the method comprising:
  providing a composition comprising particles, at least some of which are discrete and each comprise:
  a compacted swelling clay, the clay having been compacted such that it at least partially surrounds a fluid-loss preventing polymer, and
  forming the composition into a layer.

The method may involve adhering the composition to one or more other sheets of material. The method may involve sandwiching the composition between two or more other sheets of material. The other sheets of material may be as described herein.

If the method involves adhering the composition to one or more other sheets of material, the adhesive may be any suitable adhesive, e.g. an acrylic polymer (for example, commercially available from manufacturer Rohm and Haas Company under the tradename "ROBOND™ PS-90"), polyvinyl acetate (for example, commercially available from manufacturer Forbo Adhesives, LLC under the tradename "PACE®383"), or waterborne polyurethane dispersions (for example, commercially available from manufacturer Momentive Specialty Chemicals Inc. under the tradename "SNOWTACK 765A").

The clay liner described herein may be used as a barrier in any suitable environment. The clay liner may be used to provide a barrier in an outdoor environment, e.g. to form a barrier in such environment as fly-ash repositories, industrial mineral and metal mining sites, landfill sites, leachate ponds, retention ponds, and water storage reservoirs. A "leachate" may be defined as an effluent containing contaminants, produced from water (e.g., rain/storm water) percolating through a depository (e.g., a landfill, a fly-ash repository, etc.). A leachate usually contains a high concentration of electrolytes as compared to fresh water.

EXAMPLES

The following describes the production of a composition for use in GCLs and tests on its saline fluid loss capabilities across various particle size ranges. The composition contained granular bentonite and a polyanionic cellulose polymer. The compositions according to the present disclosure were compared with reference compositions that represented a granular bentonite with some polymer addition (described in more detail below). As indicated below, the production process and final product resulted in a significant advantage compared to the comparative product in terms of homogeneity and equal distribution of the added polymer in all fractions of the final product.

Production Process

The following describes a production method according to the present disclosure that involved dry mixing of bentonite production fines with a polyanionic polymer (PAC), compaction of the resultant mixture into compacted bodies (termed almonds in these Examples because of their shape) and re-crushing and sieving.

Raw materials for this trial were activated sodium bentonite particles that had a particle size distribution below 0.8 mm (i.e. at least 90 wt % of the bentonite particles passed through a sieve with openings of 0.8 mm) and the PAC polymer from Akzo Nobel: Staflo Exlo Supreme. The moisture content of the bentonite particles (before addition to the polymer) was 7-10 wt %. Moisture levels lower than about 7 wt % were found to lead to problems with the compaction. The blending ratios followed in these trials were either 98 wt % bentonite fines+2 wt % PAC polymer or 97.5 wt % bentonite fines+2.5 wt % PAC polymer.

The desired quantity of bentonite fines was collected in a fabric transportation bag and fed into a dry mixer, while the polymer was added independently by the feeding mechanism of the dry mixer. The dry mixer had a volume of 6 m$^3$, propeller speed 23 rpm and the normal loading batch is 2 mt. Typical mixing time is 2 min, and in these trials mixing times of 2 min and 4 min were tested. The dry mixer was a ribbon blender. In more detail, the dry mixer comprised a chamber having a cylindrical interior with a rotating mixing member extending along the length of the chamber. The mixing member comprised a metal axle having a plurality of flat metallic members (ribbons) extending helically around the axle, along its entire length and spaced radially from the axle by rods. Two first flat members (ribbons) extended in a clockwise direction around the axle, and two further flat members (ribbons), spaced further from the axle, radially, than the first flat member, extended in an anticlockwise direction around the axle.

Figure 1:
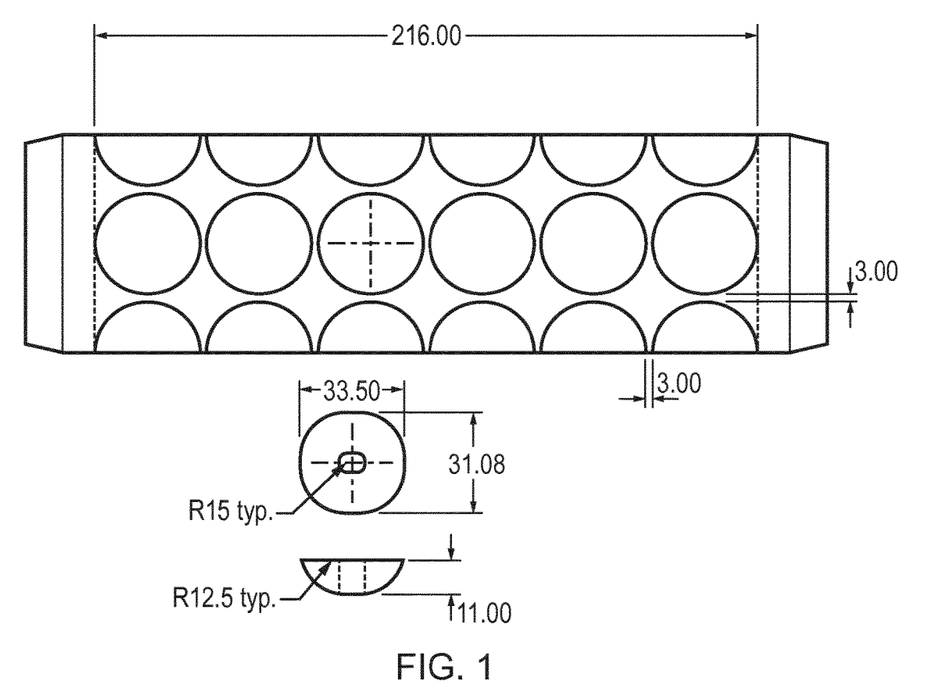
FIG. 1 illustrates, schematically, part of the exterior section of a mould for use in a compacting step described herein.
Figure 2:
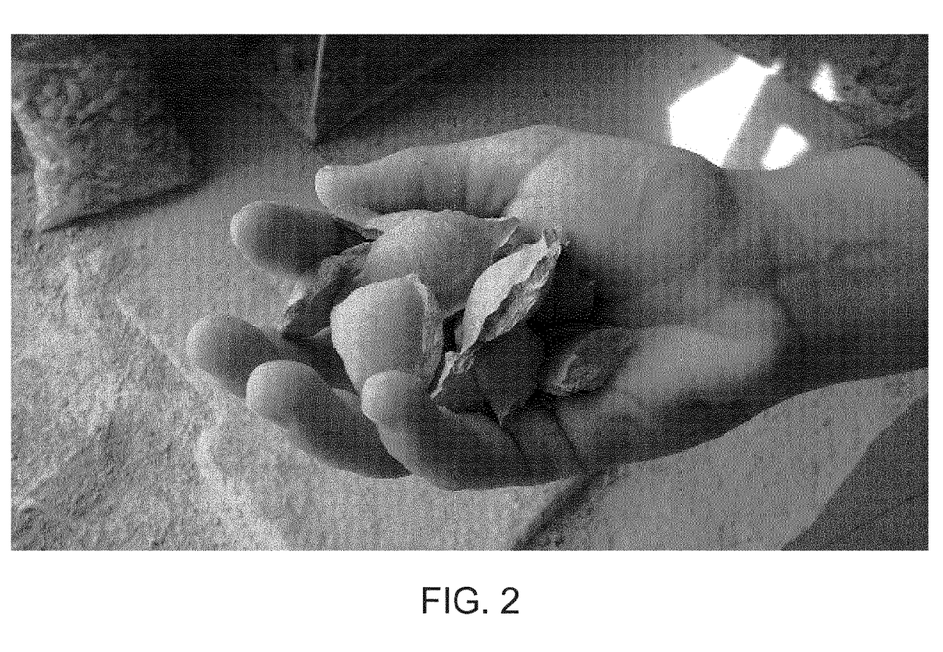
FIG. 2 shows a photograph of a plurality of compacted bodies formed during the compacting step described herein.

After the mixing step, the mixture of fines (bentonite fines+polymer adequately homogenized) was loaded into a fabric transportation bag and carried to the compactor. The compactor is fed the mixture in a capacity of 2 mt/h with normal operating pressure 1400-1700 psi and rotating speed 17 rpm. Maximum operating pressure of the specific compactor is 3000 psi. The compactor operated as a press with two opposing rotating cylindrical molds having indentations therein, resulting in bentonite granules resembling almonds. The molds of the compactor are illustrated schematically in FIG. 1, which shows the approximate dimensions of the indentations in the mold, in mm. These are only illustrative and any suitable mold dimensions could be used. FIG. 2 illustrates a hand holding a plurality of the granules formed in the compactor.

Figure 3:
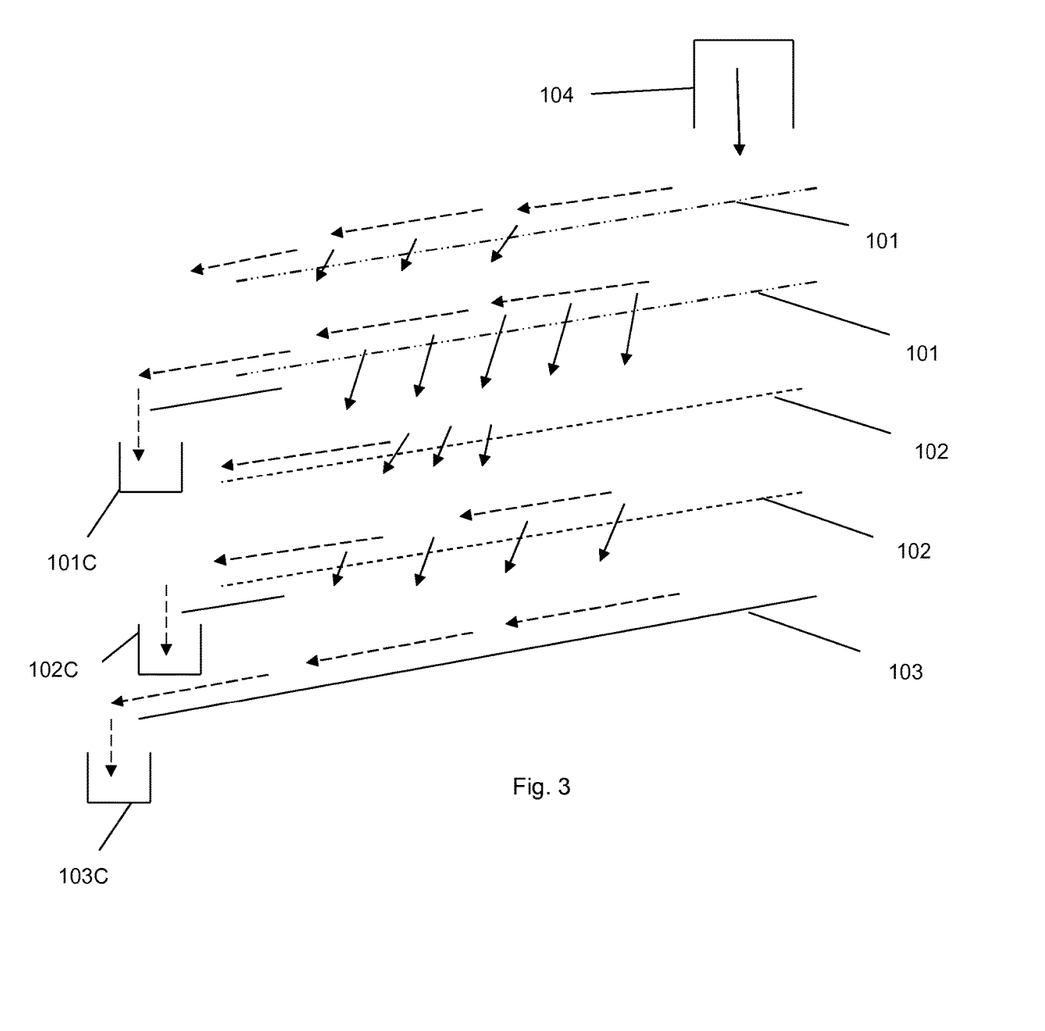
FIG. 3 illustrates, schematically, an arrangement of sieves that may be used in the method to sieve the discrete particles described herein.

Following the compression step, the bentonite+polymer granules (almonds) are conveyed to a smooth roll crusher. The crusher has two motors 5.5 kW each, 120 rpm speed of rolls and roll spacing from 3.0 mm to 10.0 mm with input size up to 30 mm. The throughput of the crusher is up to 15 MT/h depending on the roll spacing gap following the crushing step, the crushed almonds are then sieved to create three different grades: coarse (+2 mm), medium (−2 mm/+0.5 mm) and fine (−0.5 mm). The sieving machines separate the different grades by feeding the particles formed by crushing onto a first sloping sieve, below which are further sloping sieves. A schematic illustration of the arrangement of sieves is shown in FIG. 3. In this Figure is shown (i) a first group of sieves 101, all having the same size of openings, (ii) a second group of sieves 102, all having the same size of opening as one another, but smaller openings than the first group of sieves. A collection slope 103 to collect the particles passing through the lowermost of the second group of sieves 102 is shown. The particles fall onto the uppermost sieve of the first group of sieves from exit 104. The path of the particles is shown schematically in arrows, with the solid arrows depicting particles that pass through the sieves and the dashed arrows depicting particles that are retained on a sieve (or surface). From the end of each sieve, the various grades of particles are collected. More specifically, the first sieve and one or more sieves immediately below this sieve form a first group 101 and each sieve in this first group has holes of 2 mm, so that anything remaining on the upper surface these sieves that does not fall through the holes (i.e. having a size of more than 2 mm) passes along to a first collection receptacle 101C (the course grade (+2 mm)). A second group of sieves 102 below the first group each has holes of 0.5 mm, so than anything that has a size of more than 0.5 mm (but less than 2 mm) is collected from the upper surfaces of these sieves in a second collection receptacle 102 C (i.e. the medium grade (−2 mm/+0.5 mm)), and anything falling through the lowermost of this group of sieves is collected, i.e. the fine grade particles (−0.5 mm) in a third receptacle 103C.

The grade used for the GCL application is the medium fraction. The coarse fraction was re-crushed and sieved again to form a further medium fraction; and the fines were re-compacted into almonds and again put through the whole process.

Fluid Loss Tests

To control the quality of the bentonite+polymer mix as well as its homogeneity, the property tested was the fluid loss according to ASTM-D5891 Fluid Loss of Clay Component of Geosynthetic Clay Liners. In particular all intermediate and final samples of the process were tested for their fluid loss in 1% NaCl and 4% NaCl. In general, when bentonite is contacted with saline water, it loses its sealing properties causing the fluid loss results to increase. If there is sufficient amount of polymer in the bentonite, which protects it from salinity, then the fluid loss results will remain in low levels.

Trial with 2% PAC Addition and 2 Minutes Mixing Time

The following samples were tested:

S7. Raw material (RM): −0.8 mm activated sodium bentonite

S8. Mixed sample of RM+PAC

S9. Almonds after the compactor

S10. Crushed almonds coarse fraction (+2 mm) (3 samples, one every 10 min)

S11. Crushed almonds medium fraction (−2 mm/+0.5 mm) (3 samples, one every 10 min)

S12. Crushed almonds fine fraction (−0.5 mm) (3 samples, one every 10 min)

TABLE 1

Fluid loss results (mL)

| No of trial | Sample No | Description | # sample (from consistency check) | 1% NaCl (22.5' * 2) | 4% NaCl (22.5' * 2) |
| --- | --- | --- | --- | --- | --- |
| 2 | S7 | Raw material (bentonite fines), denoted 'RM' | 1 | 24 | 78 |
| | S8 | RM+ polymer (i.e. PAC) dry mix | 1 | 11.2 | 17 |
| | | | 2 | 12 | 28 |
| | S9 | Compacted dry mix | 1 | 11.6 | 17.6 |
| | | | 2 | 11.6 | 15.6 |
| | S10 | Product - coarse fraction | 1 | 12 | 22 |
| | | | 2 | 11.6 | 20.4 |
| | | | 3 | 11.6 | 11.6 |
| | S11 | Product - medium fraction | 1 | 11.6 | 25 |
| | | | 2 | 11.2 | 22.4 |
| | | | 3 | 11.6 | 15.2 |
| | P2 | Product - same as medium fraction | 1 | 11.8 | 21.4 |
| | S12 | Product - fine fraction | 1 | 11.2 | 17 |
| | | | 2 | 10.8 | 15.6 |
| | | | 3 | 11.4 | 18 |

TABLE 2

Trial with 2% PAC addition and 4 minutes mixing time
Only results from the final product are shown (medium fraction)

| sample | moisture content, % | soda ash content, % | 1% NaCl filtrate loss (22.5 min * 2), ml | pH | 4% NaCl filtrate loss (22.5 min * 2), ml |
| --- | --- | --- | --- | --- | --- |
| 1 | 10.5 | 3.2 | 11 | 10 | 24 |
| 2 after 10 min | 10.4 | 3.2 | 10.8 | 10 | 23 |
| 3 after 20 min | 10.5 | 3.1 | 10.8 | 10 | 18 |

TABLE 3

Trial with 2.5% PAC addition and 4 minutes mixing time
Only results from the final product are shown (medium fraction)

| sample | moisture content, % | soda ash content, % | 1% NaCl filtrate loss (22.5 min * 2), ml | pH | 4% NaCl filtrate loss (22.5 min * 2), ml |
|---|---|---|---|---|---|
| 1 | 10.5 | 3.4 | 10.4 | 10 | 16.8 |
| 2 after 10 min | 10.4 | 3.5 | 10.4 | 10 | 15.2 |
| 3 after 20 min | 10.5 | 3.2 | 10.0 | 10 | 15.4 |

TABLE 4

Comparison table between a commercial sample and
the final trial sample with 2.5% PAC addition

| sample origin | type | fluid loss @1% NaCl | fluid loss @ ocean water |
|---|---|---|---|
| commercial | whole sample | 9.2 | 10.4 |
| | +1 mm | 28.4 | 116 |
| | +0.5 mm | 29.6 | 118 |
| | −0.5 mm | 8.0 | 7.8 |
| Trial with 2.5% PAC | whole sample | 10.8 | 25.4 |
| | +1 mm | 11.2 | 22.0 |
| | +0.5 mm | 11.2 | 32.0 |
| | −0.5 mm | 10.8 | 16.0 |

The production method offers the same level of polymer addition in all the grades, +1 mm, −1 mm/+0.5 mm and −0.5 mm of the final trial product (medium grade) compared to the commercial product. There were some inconsistencies between the different samples of each grade. The increase of mixing time demonstrated a significant improvement on that so the preferred mixing time is 4 minutes.

The hydraulic conductivity of the materials produced during the industrial trial was determined according to ASTM D5084-10.

The sample P2 (Product—same as medium fraction, i.e. the product mentioned in Table 1 above) from the $2^{nd}$ trial was found to have a hydraulic conductivity in water of $0.78*10^{-11}$ m/s.

Also the sample from the final product (medium fraction) with 2% PAC addition (i.e. the product as mentioned in Table 2 above) was found to have hydraulic conductivity in 1% NaCl equal to $2.3*10^{-11}$ m/s.

The invention claimed is:

1. A composition for use in a geosynthetic clay liner, the composition comprising particles, at least some of which are discrete particles and each comprise:
   a compacted swelling clay, the clay having been compacted such that it at least partially surrounds a fluid-loss preventing polymer;
   wherein the particles, if divided up into three samples, the first sample having a size distribution of particles of +1 mm, the second sample having a size distribution of particles of +0.5 mm/−1 mm, and the third sample having a size distribution of 0.5 mm, and each of the first, second and third samples would show a fluid loss result of less than 15 ml for NaCl @1%, when measured according to ASTM-D5891.

2. A composition according to claim 1, wherein at least some of the discrete particles have a particle size of from 0.2 mm to 3 mm.

3. A composition according to claim 1, wherein at least some of the discrete particles have a particle size of from 0.5 mm to 2 mm.

4. A composition according to claim 1, wherein at least 90 wt % of the discrete particles pass through a sieve with openings of 3 mm.

5. A composition according to claim 1, wherein at least 90 wt % of the discrete particles are retained on a sieve with openings of 0.2 mm.

6. A composition according to claim 1, wherein at least 90 wt % of the discrete particles pass through a sieve with openings of 2 mm.

7. A composition according to claim 1, wherein at least 90 wt % of the discrete particles are retained on a sieve with openings of 0.5 mm.

8. A composition according to claim 1, wherein the swelling clay comprises a material selected from a smectite clay and a vermiculite clay.

9. A composition according to claim 8, wherein the smectite clay comprises a material selected from montmorillonite, beidellite, nontronite, hectorite, saponite, sauconite and laponite.

10. A composition according to claim 8, wherein the smectite clay comprises a bentonite.

11. A composition according to claim 1, wherein the fluid-loss preventing polymer is selected from an anionic polymer, a non-ionic polymer and a cationic polymer.

12. A composition according to claim 1, wherein the fluid-loss preventing polymer comprises an anionic polymer.

13. A composition according to claim 1, wherein the fluid-loss preventing polymer comprises a polyanionic cellulose.

14. A composition according to claim 1, wherein the fluid-loss preventing polymer is distributed substantially throughout all particle sizes of the composition.

15. A clay liner comprising the composition as defined in claim 1, wherein the composition has been formed into a layer.

16. A clay liner according to claim 15, the clay liner further comprising one or more other sheets of material.

17. A clay liner according to claim 16, wherein the one or more other sheets of material are selected from a textile sheet and a film.

18. A clay liner according to claim 16, wherein the one or more other sheets of material are selected from a textile sheet and a film.

* * * * *